(12) United States Patent
Fujita (10) Patent No.: US 8,680,804 B2
(45) Date of Patent: Mar. 25, 2014

(54) SERVO CONTROL METHOD AND SERVO CONTROL APPARATUS

(75) Inventor: Jun Fujita, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/075,353

(22) Filed: Mar. 30, 2011

(65) Prior Publication Data

US 2011/0241594 A1    Oct. 6, 2011

(30) Foreign Application Priority Data

Mar. 31, 2010  (JP) ................................ 2010-084040

(51) Int. Cl.
    *G05B 11/32*    (2006.01)

(52) U.S. Cl.
    USPC ........ 318/625; 318/34; 318/400.03; 318/609; 318/610

(58) Field of Classification Search
    USPC .......... 318/400.03, 34, 50, 85, 101, 560, 625, 318/727, 609, 610
    See application file for complete search history.

(56) References Cited

U.S. PATENT DOCUMENTS

| | | | | |
|---|---|---|---|---|
| 4,357,561 A | * | 11/1982 | Fencl | 318/50 |
| 4,594,539 A | * | 6/1986 | Michelson | 318/640 |
| 4,714,400 A | * | 12/1987 | Barnett et al. | 414/751.1 |
| 5,231,335 A | * | 7/1993 | Mega et al. | 318/85 |
| 5,646,495 A | | 7/1997 | Toyozawa | |
| 6,121,735 A | * | 9/2000 | Igeta et al. | 318/101 |
| 6,192,285 B1 | * | 2/2001 | Takayama | 700/56 |
| 6,384,561 B1 | * | 5/2002 | Niizuma et al. | 318/625 |
| 6,445,147 B1 | * | 9/2002 | Saitoh et al. | 318/34 |
| 6,577,095 B1 | * | 6/2003 | Firehammer | 318/727 |
| 6,771,036 B2 | * | 8/2004 | Fujita | 318/625 |
| 7,026,778 B2 | * | 4/2006 | Aoyama et al. | 318/600 |
| 7,038,404 B2 | * | 5/2006 | Kameyama | 318/34 |
| 7,148,635 B1 | * | 12/2006 | Piefer et al. | 318/85 |
| 7,288,909 B2 | * | 10/2007 | Yokozutsumi et al. | 318/432 |
| 7,417,386 B2 | * | 8/2008 | Piefer et al. | 318/85 |
| 7,834,567 B2 | * | 11/2010 | Naya et al. | 318/400.03 |

(Continued)

FOREIGN PATENT DOCUMENTS

| | | |
|---|---|---|
| CN | 101132158 | 2/2008 |
| JP | 50-155924 | 12/1975 |

(Continued)

OTHER PUBLICATIONS

Korean Office Action issued in 10-2011-28510 on Jul. 19, 2012.

(Continued)

*Primary Examiner* — Paul Ip
(74) *Attorney, Agent, or Firm* — DLA Piper LLP (US)

(57) ABSTRACT

A method according to an example of the present invention is a servo control method to be applied to a feed drive mechanism configured to drive an object to be driven by using a plurality of motors, in which velocity control of the object to be driven is carried out by using a signal obtained by mixing velocity feedback signals of the motors with each other, and a torque instruction obtained by the velocity control is used for drive of all the motors. By this example, there is provided a servo control system capable of preventing a phenomenon in which a transfer function changes depending on the position of the object to be driven, and the phase abruptly lags to make the operation unstable, thereby making it difficult to increase the gain, from occurring.

4 Claims, 9 Drawing Sheets

(56) References Cited

U.S. PATENT DOCUMENTS

| | | | |
|---|---|---|---|
| 2001/0008370 A1* | 7/2001 | Fujita | 318/560 |
| 2006/0186841 A1* | 8/2006 | Piefer et al. | 318/85 |
| 2007/0063662 A1* | 3/2007 | Yokozutsumi et al. | 318/139 |
| 2009/0256504 A1* | 10/2009 | Naya et al. | 318/400.03 |

FOREIGN PATENT DOCUMENTS

| | | |
|---|---|---|
| JP | 56-023394 | 3/1981 |
| JP | 7-110714 | 4/1995 |
| JP | 8-016246 | 1/1996 |
| JP | 2004-086434 | 3/2004 |
| JP | 2004-310261 | 11/2004 |
| JP | 2008-22234 | 9/2008 |

OTHER PUBLICATIONS

English Language Translation of Korean Office Action issued in 10-2011-28510 on Jul. 19, 2012.
English Language Abstract of JP 8-016246 published Jan. 19, 1996.
English Language Translation of JP 8-016246 published Jan. 19, 1996.
English Language Abstract of JP 7-110714 published Apr. 25, 1995.
English Language Translation of JP 7-110714 published Apr. 25, 1995.
Chinese Office Action issued in CN 201110086879.2 on Feb. 4, 2013.
English Language Abstract of Chinese Office Action issued in CN 201110086879.2 on Feb. 4, 2013.
English Language Abstract of CN 101132158 published Feb. 27, 2008.
English Language Abstract of JP 2004-310261 published Nov. 4, 2004.
English Language Translation of JP 2004-310261 published Nov. 4, 2004.
English Language Abstract of JP 2004-086434 published Mar. 18, 2004.
English Language Translation of JP 2004-086434 published Mar. 18, 2004.
Japanese Office Action issued in JP 2010-084040 on Oct. 1, 2013.
English Language Translation of Japanese Office Action issued in JP 2010-084040 on Oct. 1, 2013.
English Language Abstract of JP 56-023394 published on Mar. 5, 1981.
English Language Abstract of JP 2008-222334 published on Sep. 25, 2008.
English Language Translation of JP 2008-222334 published on Sep. 25, 2008.

* cited by examiner

SERVO CONTROL METHOD AND SERVO CONTROL APPARATUS

CROSS-REFERENCE TO RELATED APPLICATIONS

This application is based upon and claims the benefit of priority from prior Japanese Patent Application No. 2010-084040, filed Mar. 31, 2010, the entire contents of which are incorporated herein by reference.

BACKGROUND OF THE INVENTION

1. Field of the Invention

The present invention relates to a servo control method and servo control apparatus in a feed drive mechanism configured to drive one mobile object by means of a plurality of motors.

2. Description of the Related Art

Figure 5:
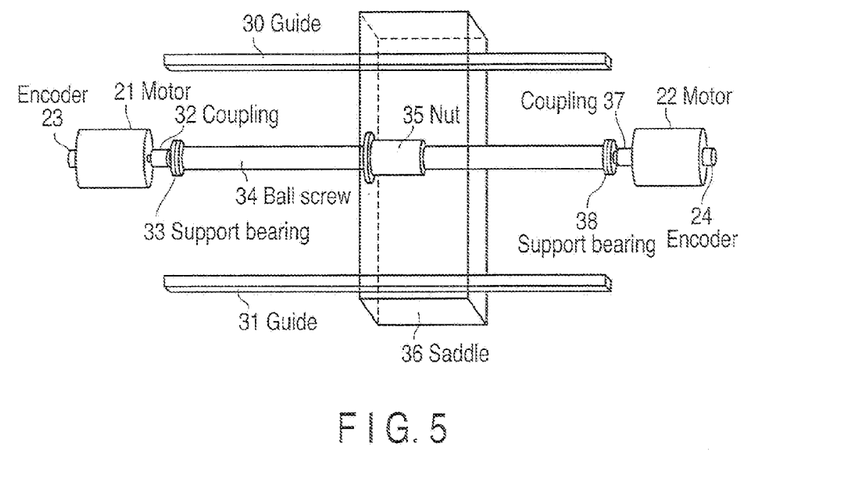
FIG. 5 shows a structure example of a feed drive mechanism configured to drive one object to be moved by means of a plurality of motors.

A method of controlling a position and velocity or torque of an object to be moved by means of a plurality of motors is known (ex. Jpn. Pat. Appln. KOKAI Publication No. 7-110714). An example of a feed drive mechanism configured to drive one object to be moved by using a plurality of motors is shown in FIG. 5. This mechanism is configured to drive one ball screw 34 by means of motors 21 and 22 arranged at both ends thereof to move a saddle 36 along guides 30 and 31. The ball screw 34 is supported by bearings 33 and 38, and a nut 35 is fixed to the saddle 36.

Figure 6:
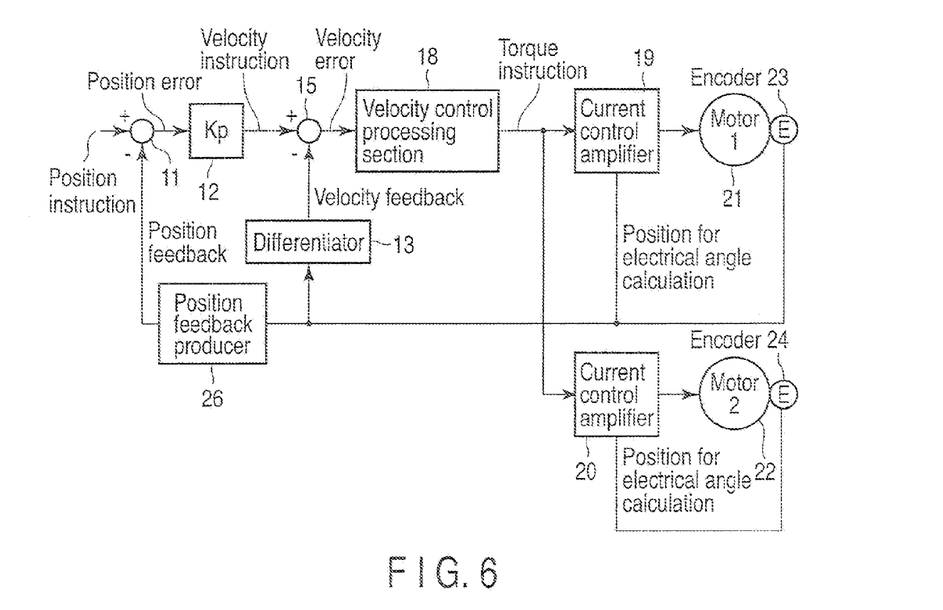
FIG. 6 is a block configuration diagram showing a conventional control system configured to control the feed drive mechanism of FIG. 5.

A block configuration diagram showing a conventional control system configured to control the feed drive mechanism is shown in FIG. 6.

In this control system, although the two motors are provided, the position/velocity control system is constituted of one system, and position/velocity control is carried out by position feedback and velocity feedback by using an encoder 23 of the motor 21.

The encoder 23 outputs a position signal for electrical angle calculation in accordance with the rotation of the motor 21. This position signal is output as a binary numerical value indicating a rotor rotation angle of the motor 21 obtained by dividing one revolution into, for example, segments of $1/2^{20}$. Likewise, an encoder 24 also outputs a position signal for electrical angle calculation. As the motors 21 and 22, for example, synchronous motors are used. The motor is not limited to the synchronous motor, and a DC motor can be used in accordance with the use.

A position feedback producer 26 produces (calculates) a drive object movement amount per position control period. That is, the position feedback producer 26 produces mechanical position feedback obtained by dividing an amount of change in an output value from the encoder 23 per position control period by a number of counts per revolution of the encoder, multiplying the above obtained value by a movement amount of the mechanism (object to be driven) per revolution of the encoder, and then integrating the multiplication results.

A subtracter 11 subtracts the mechanical position feedback from a position instruction transmitted from a main control section (not shown) to output a position error. A multiplier 12 multiplies the position error by a position control gain Kp, and outputs the multiplication result as a velocity instruction.

A differentiator 13 differentiates a position signal output from the encoder 23, and outputs the differentiation result as a velocity feedback signal. A subtracter 15 subtracts a value of the velocity feedback signal from a value of the velocity instruction, and outputs the subtraction result as a velocity error. A velocity control processing section 18 subjects the velocity error to velocity control such as proportional integral operation or the like, and outputs the control result as a torque instruction. It should be noted that differentiation of the control system of the digital sampling system can be replaced with difference calculation.

A current control amplifier 19 converts the position signal from the encoder into an electrical angle, generates a motor drive signal on the basis of the electrical angle and torque instruction, and rotationally drives the motor 21. A control amplifier 20 also operates in a manner identical with the control amplifier 19.

A transfer function from the torque of such a feed drive mechanism to the velocity, i.e., a frequency characteristics of the velocity feedback signal which is the output of the differentiator 13 for the torque instruction which is the output signal of the velocity control processing section 18, obtained by simulation is shown in FIG. 7.

Figure 7A:
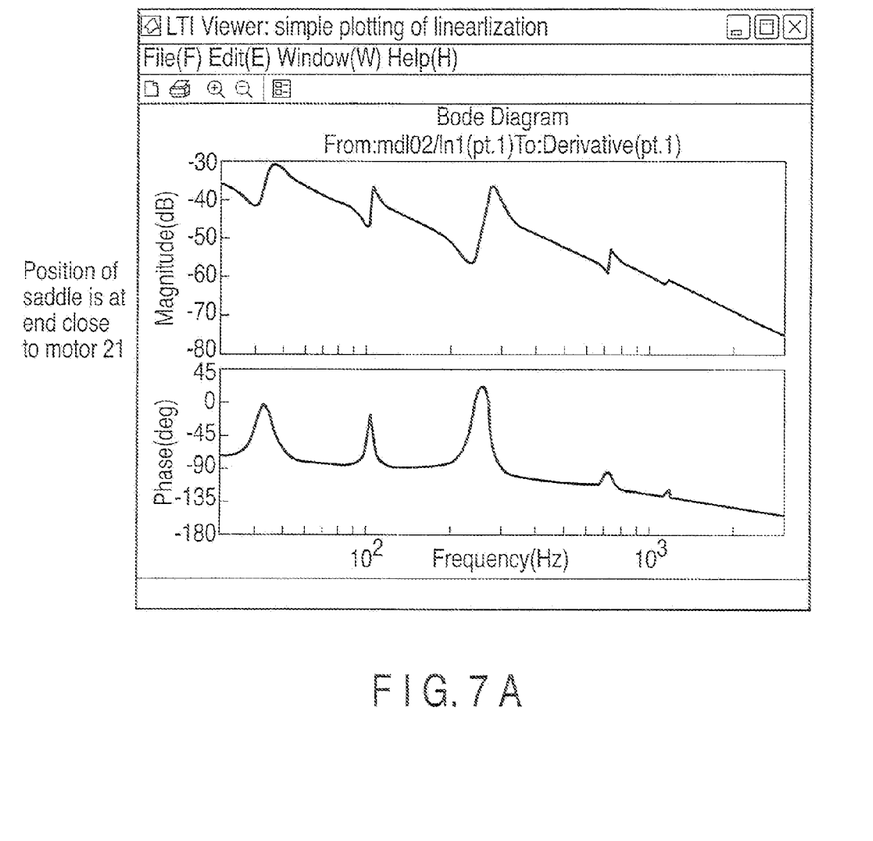
FIGS. 7A, 7B and 7C show results of obtaining a transfer function from the torque of a feed drive mechanism using the control system of FIG. 6 to the velocity feedback by simulation.
Figure 7B:
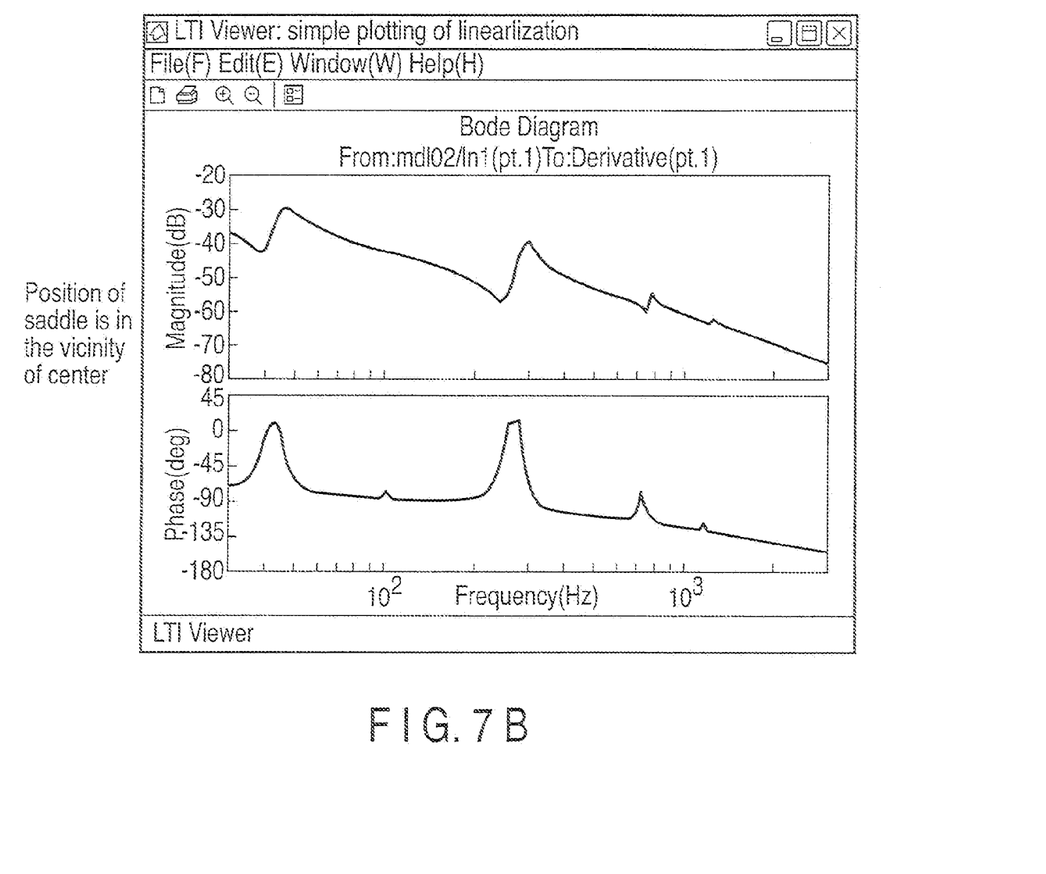
Figure 7C:
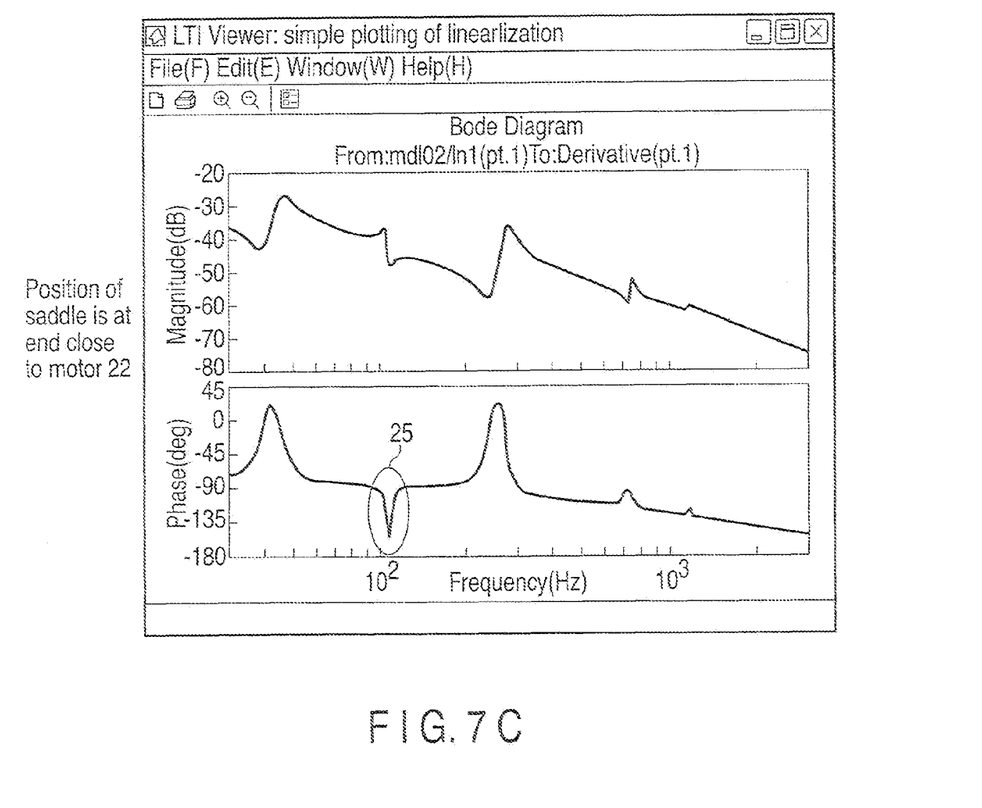

FIG. 7A shows a transfer function of a case where the saddle 36 is positioned at an end close to the motor 21, FIG. 7B shows a transfer function of a case where the saddle 36 is positioned at a part in the vicinity of the center, and FIG. 7C shows a transfer function of a case where the saddle 36 is positioned at an end close to the motor 22. As can be seen from FIGS. 7A to 7C, the transfer function changes depending on the position of the saddle 36 and, in the case of FIG. 7C where the saddle 36 is positioned close to the motor 22, a part in which the phase abruptly lags at a relatively low frequency occurs as indicated by an ellipse 25. In general, when the phase lag is 180°, and gain is greater than 0 db, the operation becomes unstable, and control becomes difficult to carry out. Accordingly, the characteristics of the control system shown in FIG. 7C become a hindrance to enhancement of the gain of the velocity control system, thereby causing a problem that it becomes difficult to sufficiently increase the gain. That the gain cannot be sufficiently increased implies that a sufficient response speed cannot be obtained.

BRIEF SUMMARY OF THE INVENTION

Accordingly, an object of the present, invention is to provide a servo control system capable of preventing a phenomenon in which a transfer function changes depending on the position of an object to be driven, and the phase abruptly lags to make the operation unstable, thereby making it difficult to increase the control gain, from occurring, and making it possible to stably increase the gain.

According to an example of the present invention, there is provided a servo control method to be applied to a feed drive mechanism configured to drive an object to be driven by using a plurality of motors, in which velocity control of the object to be driven is carried out by using a signal obtained by mixing velocity feedback signals of the motors with each other, and a torque instruction obtained by the velocity control is used for drive of all the motors.

By the example described above, it becomes possible to prevent the phenomenon in which a transfer function changes depending on the position of an object to be driven, and the phase abruptly lags to make the operation unstable, thereby making it difficult to increase the control gain, from occurring, and make it possible to stably increase the gain.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, examples of a servo control method according to the present invention will be described below with reference to the drawings.

Figure 1:
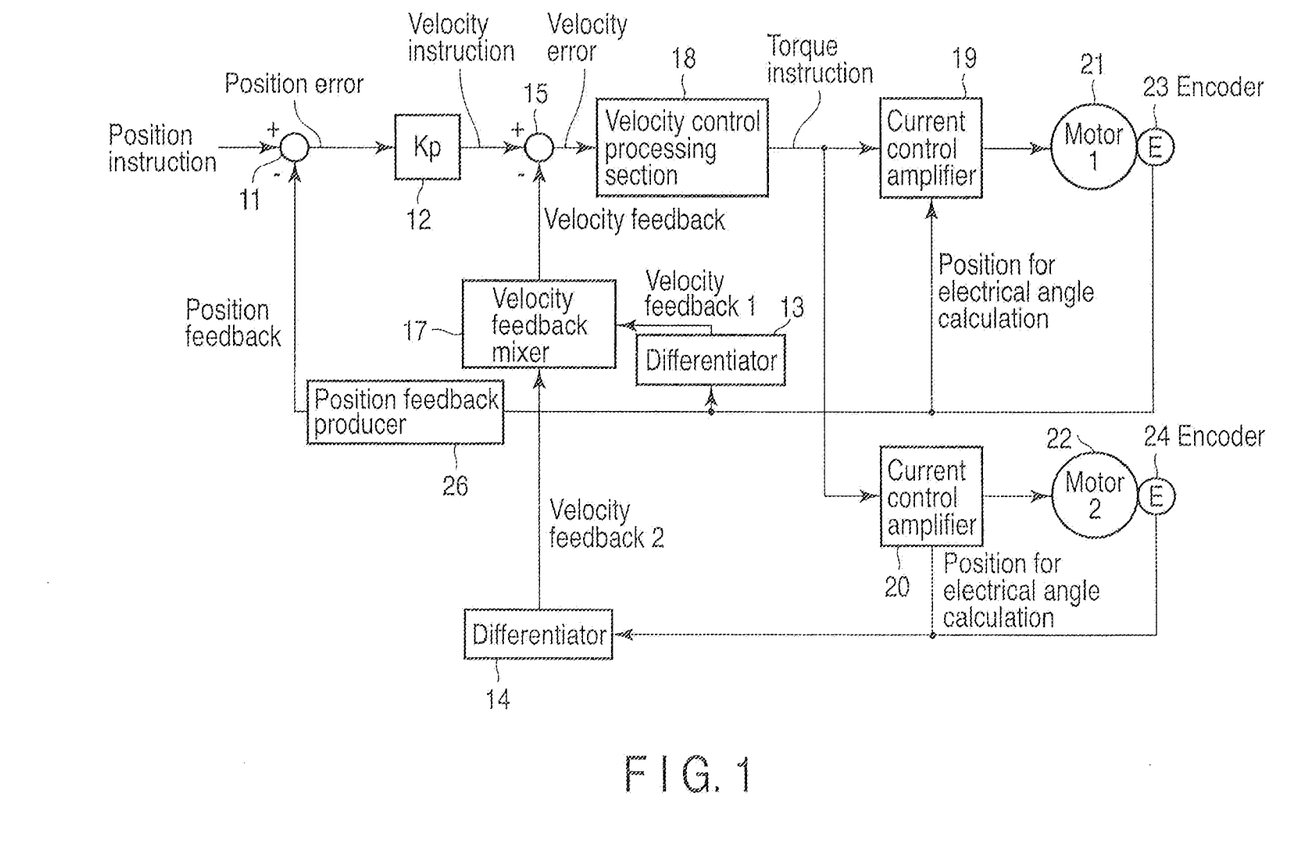
FIG. 1 is a block configuration diagram of an apparatus to which a servo control method according to a first example is applied.

FIG. 1 is a block configuration diagram of a first example of an apparatus to which a servo control method according to the present invention is applied. Elements identical with those in FIG. 6 of the conventional configuration are denoted by identical reference symbols, and a detailed description of them is omitted. The servo control apparatus of this example can also be applied to, for example, the feed drive mechanism of FIG. 5.

As compared with the configuration of FIG. 6, a differentiator 14, and velocity feedback mixer 17 are added to the configuration of the first example shown in FIG. 1. The differentiator 14 differentiates a position signal output from the encoder 24, and outputs velocity feedback 2 as a differentiation result. The differentiator 13 differentiates a position signal output from the encoder 23, and outputs velocity feedback 1 as a differentiation result. The velocity feedback mixer 17 mixes the velocity feedback 1 and velocity feedback 2 with each other, and outputs a velocity feedback signal. The operation to be carried out hereafter is identical with FIG. 6.

In the conventional system, as a velocity feedback signal used for velocity control, only the signal obtained from the encoder 23 of the motor 21 has been used. Conversely, in this example, the velocity feedback 1, and velocity feedback 2 obtained from the encoders 23 and 24 of the motors 21 and 22 are mixed with each other by the velocity feedback mixer 17 to be used as the velocity feedback signal.

As the mixing method of the velocity feedback mixer 17 for obtaining the feedback signal, although some methods are conceivable, as the simplest example, there is a method of using a simple average value obtained by adding the two signal values of the velocity feedback 1 and velocity feedback 2 together and dividing the sum by two.

As methods other than the above, averaging by changing the ratio, changing the ratio in accordance with the position of the object to be driven, and the like are conceivable. For example, the mixing ratio is continuously changed in such a manner that, when the position of the saddle is at the center of the stroke (guide), the mixing ratio of the velocity feedback becomes 1:1, when the saddle is at the end on the motor 1 side, the mixing ratio becomes 1:0, and when the saddle is at the end on the motor 2 side, the mixing ratio becomes 0:1.

Figure 2A:
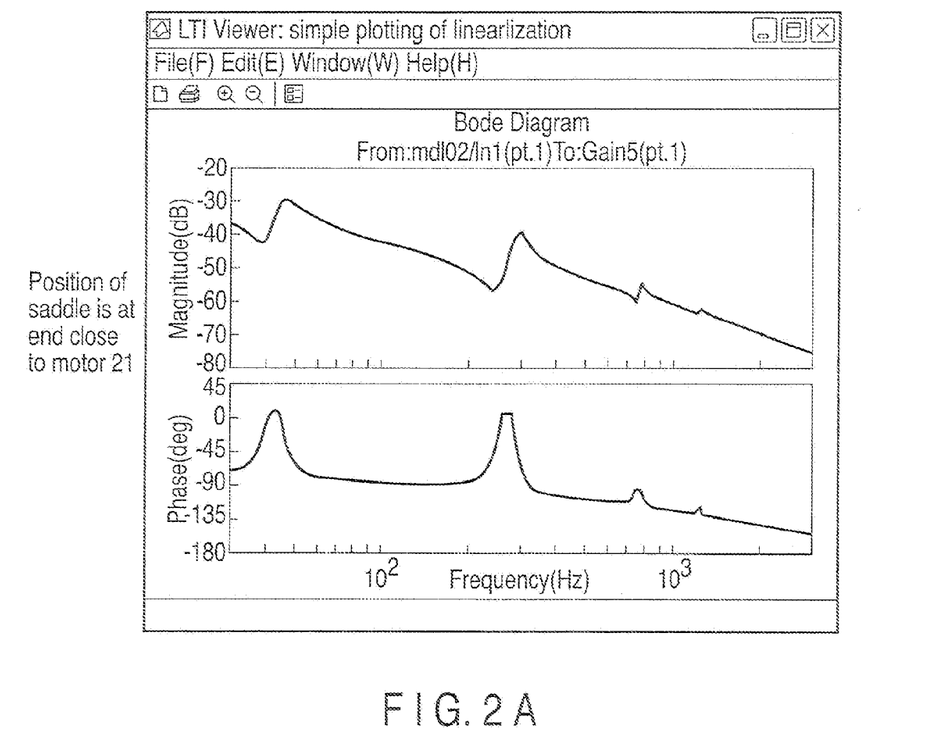
FIGS. 2A, 2B and 2C show results of simulating a transfer function from the torque to the velocity feedback by using a method of adding two velocity feedback signals together and dividing the sum by two.
Figure 2B:
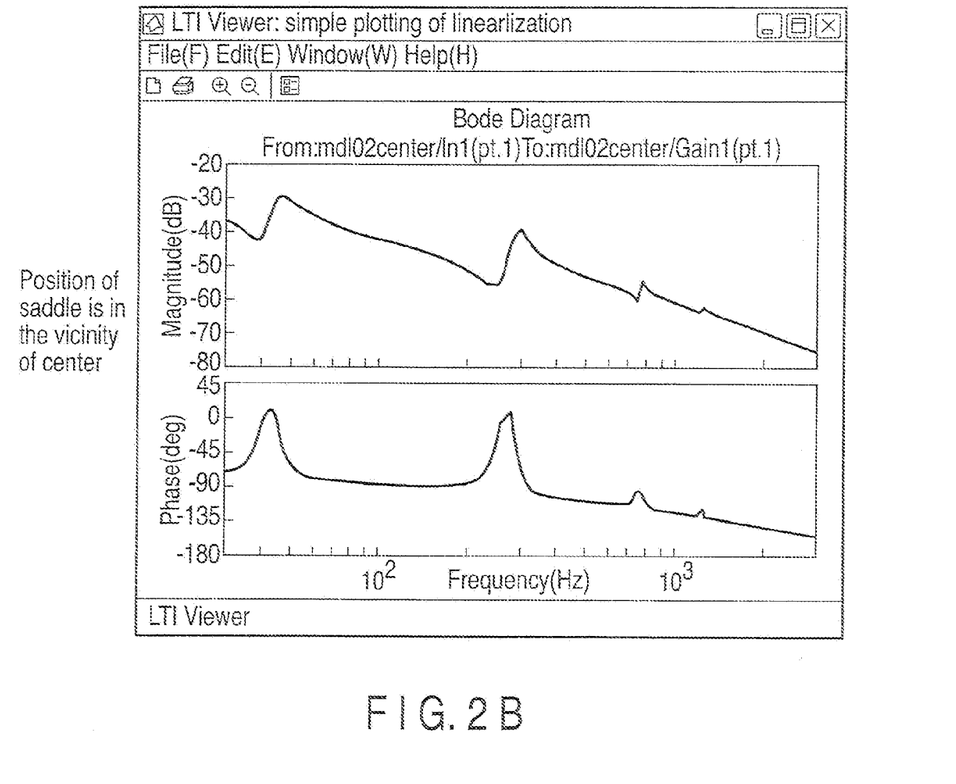
Figure 2C:
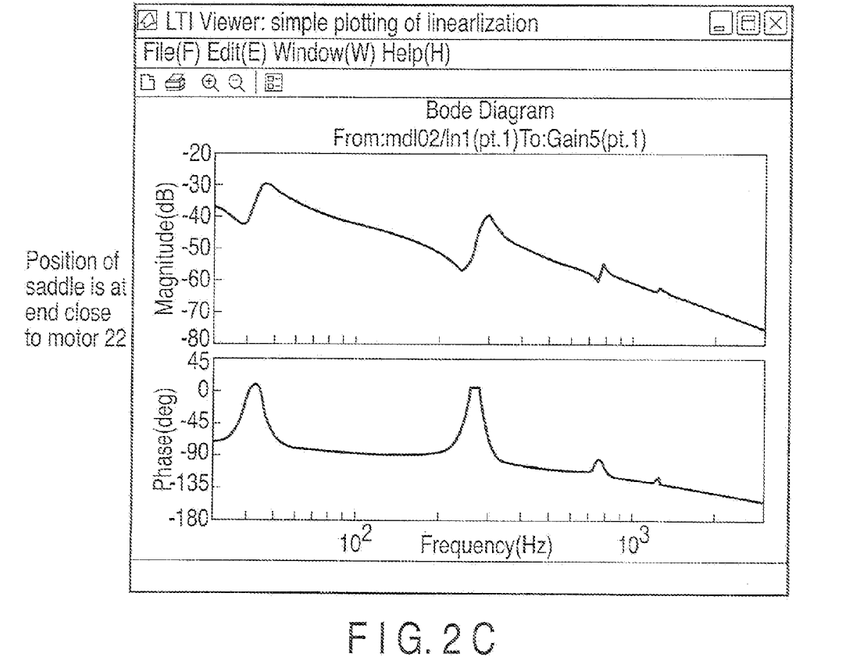

FIGS. 2A, 2B, and 2C show the results of simulating the transfer function from the torque to the velocity feedback by the method of adding two velocity feedback signal values together, and dividing the sum by two. At each position of FIGS. 2A, 2B, and 2C, excellent characteristics are obtained without the phase abruptly lagging. It should be noted that an apparatus was actually manufactured by employing the configuration shown in FIG. 1 and, as a result of measuring the transfer function, characteristics identical with FIG. 2 were obtained.

Figure 3:
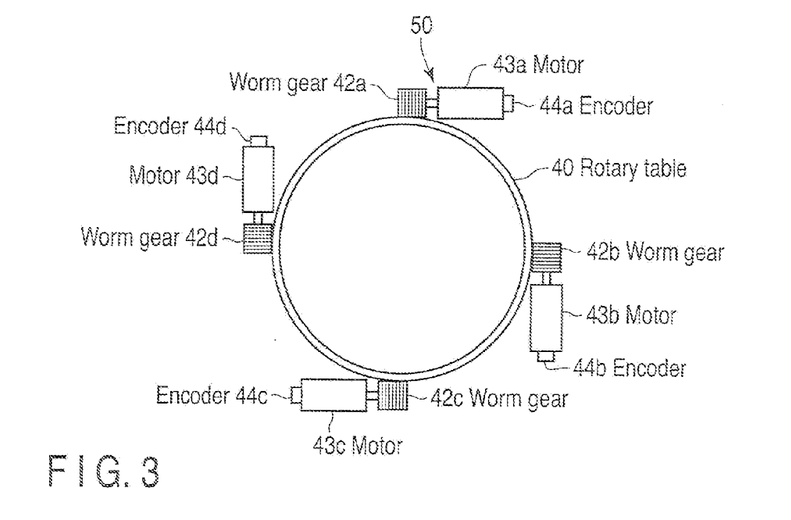
FIG. 3 shows a structure example of a feed drive mechanism according to a second example of the present invention.
Figure 4:
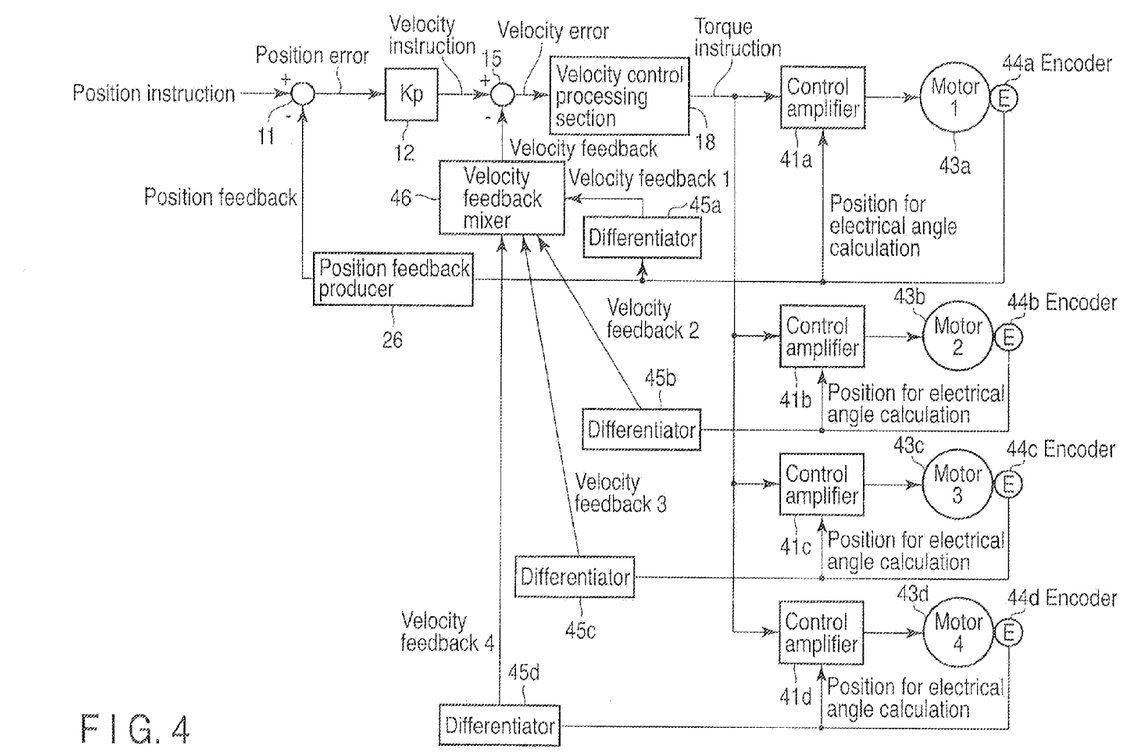
FIG. 4 is a block configuration diagram showing the second example of a servo control apparatus according to the present invention applied to the feed drive mechanism of FIG. 3.

FIGS. 3 and 4 show a second example of the present invention. This is an example in which one rotary table is rotationally driven by using worm gears, and by means of four motors.

As shown in FIG. 3, four drive sections 50 each of which is constituted of a motor 43, worm gear 42, and encoder 44, are provided on the periphery of a rotary table 40, and teeth to be engaged with the worm gears 42 are formed around the circumference of the rotary table 40. The configuration shown in FIG. 3 is applied to a case where the mass of the rotary table 40 is large, and it is difficult to drive the table by using one drive section.

As shown in FIG. 4, each of outputs (position signals for electrical angle calculation) of the encoders 44a to 44d is supplied to each of control amplifiers 41a to 41d, is differentiated by each of differentiators 45a to 45d, and the differentiation results are supplied to a velocity feedback mixer 46. Further, the output of the encoder 44a is supplied to a subtracter 11 through a position feedback producer 26. The velocity feedback mixer 46 provides, for example, an average value of velocity feedback signals supplied thereto from the four differentiators 45a to 45d to a subtracter 15. The operation to be carried out hereafter is identical with the example of FIG. 1.

By the configuration described above, as a transfer function of the velocity feedback for the torque instruction, excellent characteristics in which the phase does not abruptly lag at any position can be obtained as shown in FIG. 2.

As has been described above, even when the characteristics of the control system become unstable depending on the state (position) of the load, and the gain cannot be increased by the conventional method, it is possible, by the method of the present invention, to further increase the gain without causing instability of the characteristics, i.e., to improve the response speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A servo control apparatus to be applied to a feed drive mechanism configured to drive an object to be driven by means of first and second motors, comprising:
   a first differentiator configured to differentiate a first position signal for electrical angle calculation of the first motor to output a first feedback signal;
   a second differentiator configured to differentiate a second position signal for electrical angle calculation of the second motor to output a second feedback signal;
   a mixer configured to mix the first and second feedback signals with each other to output a third feedback signal;
   a velocity controller configured to carry out velocity control by using the third feedback signal to output a torque instruction value; and
   first and second current controllers configured to drive the first and second motors by using the torque instruction value.

2. The servo control apparatus according to claim 1, wherein the object to be driven is linearly driven by the first and second motors.

3. The servo control apparatus according to claim 1, wherein the object to be driven is rotationally driven by the first and second motors.

4. A servo control apparatus to be applied to a feed drive mechanism configured to drive an object to be driven by means of a first and second motors, comprising:
   first differentiation means for differentiating a first position signal for electrical angle calculation of the first motor to output a first feedback signal;
   second differentiation means for differentiating a second position signal for electrical angle calculation of the second motor to output a second feedback signal;
   mixing means for mixing the first and second feedback signals with each other to output a third feedback signal;
   velocity control means for carrying out velocity control by using the third feedback signal to output a torque instruction value; and
   first and second current control means for driving the first and second motors by using the torque instruction value.

* * * * *